United States Patent [19]

Epperly et al.

[11] Patent Number: 4,770,863

[45] Date of Patent: Sep. 13, 1988

[54] PROCESS FOR THE REDUCTION OF NITROGEN OXIDES IN AN EFFLUENT

[75] Inventors: William R. Epperly, New Canaan; James C. Sullivan, Southport, both of Conn.

[73] Assignee: Fuel Tech, Inc., Stamford, Conn.

[21] Appl. No.: 14,431

[22] Filed: Feb. 13, 1987

[51] Int. Cl.$^4$ ............................................. C01B 21/00
[52] U.S. Cl. ................................................... 423/235
[58] Field of Search ................. 423/235, 235 D, 239, 423/239 A

[56] References Cited

U.S. PATENT DOCUMENTS

| | | | |
|---|---|---|---|
| 3,801,696 | 4/1974 | Mark | 423/212 |
| 3,846,981 | 11/1974 | Paczkowski | 60/286 |
| 3,900,554 | 8/1975 | Lyon | 423/235 |
| 4,208,386 | 6/1980 | Arand et al. | 423/235 |
| 4,325,924 | 4/1982 | Arand et al. | 423/235 |
| 4,507,269 | 3/1985 | Dean et al. | 423/235 |
| 4,624,840 | 11/1988 | Dean et al. | 423/235 |

FOREIGN PATENT DOCUMENTS

| | | |
|---|---|---|
| 2630202 | 2/1977 | Fed. Rep. of Germany . |
| 5067609 | 12/1976 | Japan . |
| 511138 | 7/1977 | Japan . |
| 1514588 | 7/1977 | Japan . |
| 5112330 | 8/1977 | Japan . |
| 5189176 | 2/1978 | Japan . |
| 53-128023 | 11/1978 | Japan ................................. 423/235 |

*Primary Examiner*—Gregory A. Heller
*Attorney, Agent, or Firm*—St. Onge Steward Johnston & Reens

[57] ABSTRACT

A process for the reduction of nitrogen oxides from an effluent from the combustion of a carbonaceous fuel is presented. More particularly, this process comprises injecting into the effluent droplets of a mixture comprising ammonia and an enhancer selected from the group consisting of hexamethylenetetraamine, a lower carbon alcohol, sugar, furfural, furfural derivatives, a hydroxyl amino hydrocarbon, an amino acid, a protein-containing composition, mixtures of ortho-, meta-, and para-methyl phenols, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof, under conditions effective to reduce the concentration of nitrogen oxides in the effluent.

19 Claims, No Drawings

PROCESS FOR THE REDUCTION OF NITROGEN OXIDES IN AN EFFLUENT

TECHNICAL FIELD

The present invention relates to a process for the reduction of nitrogen oxides ($NO_x$) in the effluent, especially the oxygen-rich effluent, of the combustion of a carbonaceous fuel by the injection of a mixture of ammonia and an enhancer into the effluent.

Carbonaceous fuels can be made to burn more completely, and with reduced emissions of carbon monoxide and unburned hydrocarbons, when the oxygen concentrations and air/fuel ratios employed are those which permit high flame temperatures. When fossil fuels are used to fire large utility boilers, temperatures above about 2000° F. and typically about 2200° F. to about 3000° F. are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides.

Nitrogen oxides are troublesome pollutants which are found in the combustion effluent streams of large utility boilers when fired as described above, and comprise a major irritant in smog. It is further believed that nitrogen oxides often undergo a process known as photochemical smog formation, through a series of reactions in the presence of sunlight and hydrocarbons. Moreover, nitrogen oxides comprise a major portion of acid rain.

Unfortunately, the high temperatures within a utility boiler renders most common methods of reducing $NO_x$ concentrations, such as effluent scrubbing or catalyst grids, uneconomical, unfeasible, or both.

BACKGROUND ART

Many different processes and compositions have been proposed for the reduction of nitrogen oxides in an effluent, each process and/or composition providing improved $NO_x$ reduction. For instance, in U.S. Pat. No. 3,900,554, Lyon discloses reducing nitrogen monoxide (NO) in a combustion effluent using ammonia and specified ammonia precursors or their aqueous solutions which are injected into the effluent for mixing with the nitrogen monoxide at a temperature within the range of 1600° F. to 2000° F. Lyon also suggests the use of reducing agents, such as hydrogen or various hydrocarbons, to permit the effective use of ammonia at effluent temperatures as low as 1300° F. Lyon points out that at temperatures above 2000° F., the use of ammonia as disclosed in the patent is counterproductive, increasing NO rather than decreasing it.

Unfortunately, access to the effluent stream of a large industrial boiler at a location where the temperature is from 1600° F. to 2000° F. is often not possible without major redesign of the boiler due to exterior water jacketing and interior water tubes. The use of hydrogen to permit operation at temperatures as low as 1300° F. is prohibitively expensive. Thus, the teaching of Lyon is not usable for most large utility boilers.

Dean et al., using the Lyon method as a starting point, disclose a method for reducing $NO_x$ concentrations in an effluent having a temperature of from 1880° F. to 2920° F., in U.S. Pat. No. 4,624,840. The Dean et al. process involves the injection of ammonia into the effluent stream at a point where the effluent is rapidly cooling. As discussed above, though, injection at the most desirable locations is frequently not possible in large utility boilers. Further, the Dean et al. process requires specific effluent cooling rate measurements, appropriate software and the solution of a complex set of simultaneous equations for determining the amount of ammonia to be injected and the location of the proper injection point to achieve NO reduction, a significant disadvantage over processes which can be operated without the need for such extreme procedures.

Bowers, in copending and commonly assigned U.S. patent application Ser. No. 811,532, filed Dec. 20, 1985, effects the reduction in $NO_x$ concentrations in the effluent from the combustion of a carbonaceous fuel without the use of ammonia with its attendant disadvantages through the use of a solution comprising additives selected from the group consisting of guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, hexamethylenetetramine and mixtures thereof. In copending and commonly assigned U.S. patent application Ser. No. 784,828, filed Oct. 4, 1985, now U.S. Pat. No. 4,719,092 Bowers discloses the use of an aqueous urea solution, which also comprises an oxygenated hydrocarbon, in the reduction of nitrogen oxides in an effluent.

Although many of the above-described compositions are effective for reducing nitrogen oxides in an effluent from the combustion of a carbonaceous fuel, there exists the present need to produce compositions which elicit still further reductions in the $NO_x$ concentrations in such effluents, especially at effluent temperatures which are practical for use with most common utility boilers.

DISCLOSURE OF INVENTION

The present invention relates to a process for reducing the concentration of nitrogen oxides in an effluent from the combustion of a carbonaceous fuel, which process comprises injecting into the effluent droplets of a mixture comprising ammonia ($NH_3$) and an enhancer. Suitable enhancers which may be used with ammonia in the practice of this invention include hexamethylenetetraamine (HMTA), a lower carbon alcohol, such as methanol, ethylene glycol or glycerol; sugar; furfural; furfural derivatives such as hydroxymethyl furfural; hydroxyl amino hydrocarbons such as monoethanolamine; amino acids; protein-containing compositions such as skimmed milk or powdered milk; and mixtures of ortho-, meta-, and para-methyl phenols, such as cresylic acid. Other enhancers which may be suitable for use in this invention include guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof.

Advantageously, the ammonia is injected into the effluent to provide a molar ratio of ammonia to the baseline nitrogen oxides concentration of about 1:5 to about 5:1, more preferably about 1:3 to about 3:1 and most preferably about 1:2 to about 2:1. The enhancer is present in the ammonia/enhancer mixture in a weight ratio of enhancer to ammonia of, preferably, about 1:5 to about 4:1, more preferably about 1:4 to about 3:1. Most preferably, the weight ratio of enhancer to ammonia in the ammonia/enhancer mixture is about 1:3 to about 3:1.

Typically, the ammonia/enhancer mixture is prepared by dissolving a water-soluble enhancer in water at a concentration of about 5 to about 25 weight percent, more preferably about 10 to about 20 weight percent, and the desired amount of ammonia mixed in. Alternatively, gaseous ammonia, or ammonia in water, and the enhancer can be injected separately.

The ammonia/enhancer mixture is injected into the effluent under conditions effective to reduce the concentration of nitrogen oxides in the effluent. Such conditions include the temperature of the effluent at the point of injection and the respective concentrations of ammonia and the enhancer in the mixture, which are selected to achieve the desired reduction in the nitrogen oxides concentrations in the effluent.

For the purposes of this description, the term "alcohol" refers to a hydrocarbon derivative in which one or more hydrogen atoms have been replaced by an —OH group; the term "lower carbon" refers to a carbon compound which contains no more than six carbon atoms; the term "sugar" refers to a number of useful saccharide materials which are capable of enhancing the ability of ammonia to decrease the $NO_x$ concentration in an effluent under conditions as described herein, including non-reducing and reducing water soluble mono-saccharides and the reducing and non-reducing polysaccharides and their degradation products, such as pentoses including aldopentoses, methyl pentoses, keptopentoses like xylose and arabinose, deoxyaldoses like rhaminose, hexoses and reducing saccharides such as aldo hexoses like glucose, galactose and mannose, ketohexoses like fructose and sorbose, disaccharides like lactose and maltose, non-reducing disaccharides like sucrose and other polysaccharides such as dextrin and raffinose, hydrolyzed starches which contain as their constituents oligosaccharides, and water dispersible polysaccharides; the term "amino acid" refers to any organic compound containing an amino group ($NH_2$) and a carboxylic acid group (COOH); the term "protein" refers to a polymeric compound having amino acids as the structural unit; the term "skimmed milk" refers to milk having some or all of the fat removed; the term "powdered milk" refers to non-fat dry milk, available commercially as Carnation Instant Non-Fat Dry Milk from Carnation Company of Los Angeles, Calif.

Advantageously, the enhancer used is either hexamethylenetetramine, furfural, furfural derivatives, sugar or a lower carbon alcohol, especially ethylene glycol (EG). By use of an enhancer or enhancers in combination with ammonia, it has been found that the reductions in $NO_x$ concentrations achieved are greater than those achieved by the use of ammonia alone and without some of the disadvantages which arise from the use of ammonia alone.

For the purposes of this description, all temperatures herein are measured using an unshielded K-type thermocouple. Unless otherwise indicated, all parts and percentages are based on the weight of the composition at the particular point of reference.

The term ammonia as employed in this description includes the compound ammonia itself or in aqueous solution, as well as compounds equivalent in effect. Among the compounds are ammonium carbonate, ammonium formate, ammonium oxalate and their solutions in water. All of the above substances will yield ammonia on vaporization, while the formate and oxalate will also yield formic acid and oxalic acid, respectively. Such vaporization may be done as a separate step or directly through the injection into the hot effluent, as desired. If vaporization of ammonium formate or ammonium oxalate, or their solutions, is done as a separate step, then the resulting formic acid and/or oxalic acid may be decomposed to form hydrogen by either thermal or catalytic means prior to injection into the effluent.

Although ammonia can be used in its pure form, and the enhancer mixed into it, solutions, especially aqueous solutions of ammonia and the enhancer are preferred due to their economy and the fact that they can be employed with suitable effectiveness in most situations. The effective solutions will vary from saturated to dilute. While water is an effective solvent for most applications, it will be recognized that there may be instances where other solvents may be more advantageous, either alone or in combination with water.

The temperature of the effluent at the point of injection of the ammonia/enhancer mixture of this invention is preferably in the range of about 1300° F. to about 1700° F.

The effluent into which the mixture of this invention is injected is preferably oxygen-rich, meaning that there is an excess of oxygen in the effluent. Advantageously, the excess of oxygen is less than about 10% by volume. Most preferably, the excess of oxygen is in the range of about 1% to about 6% by volume.

Combinations of ammonia with the named enhancers are employed as $NO_x$ reduction optimization and economics dictate. The concentration of the enhancer to be injected into the effluent in concert with ammonia should be that concentration which is sufficient to provide a reduction in the concentration of $NO_x$ in the effluent greater than that elicited by the use of ammonia alone.

Advantageously, the ammonia/enhancer mixture is injected into the effluent so as to provide a molar ratio of the nitrogen in the ammonia and enhancer to the baseline nitrogen oxides level of about 1:5 to about 6:1, more preferably, about 1:3 to about 3:1 and most preferably about 1:2 to about 2.5:1.

A surprising and advantageous result arising from the use of the ammonia and enhancer mixture of this invention is in the fact that the after-treatment effluent contains less ammonia, a pollutant in and of itself, than effluent treated according to commonly used prior art methods. As discussed above, the presence of ammonia in the effluent at higher temperatures can be counterproductive, in that the ammonia can react with $SO_3^=$ to form ammonium bisulfate which can foul heat exchange surfaces in a boiler. Moreover, ammonia has detrimental effects on ambient air quality. The reason for the lower level of ammonia with the practice of this invention is not fully understood, but is probably the product of the series of reactions between ammonia, the enhancer and the effluent $NO_x$, which utilizes the ammonia more fully than in prior art processes.

BEST MODE FOR CARRYING OUT THE INVENTION

The following example further illustrates and explains the invention detailing the operation of ammonia/enhancer mixture in the reduction in nitrogen oxide emissions.

EXAMPLE I

The burner used is a burner having an effluent flue conduit, known as a flame tube, approximately 209 inches in length and having an internal diameter of 8 inches and walls 2 inches thick. The burner has a flame area adjacent the effluent entry port and flue gas monitors adjacent the effluent exit port to measure the concentration of compositions such as nitrogen oxides, sulfur oxides, ammonia carbon monoxide, and other compounds of interest which may be present in the effluent. The effluent flue conduit additionally has a thermocouple for temperature measurement disposed through ports in the interior at several points.

The burner is fired using number 2 oil at a fuel supply rate of 10.2 lbs/hour and with an excess of oxygen of about 3.0%. Treatment solutions as described below are injected into the effluent as a fine spray through the injection probe described in copending U.S. patent application having Ser. No. 07/009,696, filed Feb. 2, 1987, at a rate of 200 ml/hour at a position adjacent a thermocouple.

The temperature of the effluent into which the treatment mixtures are injected is measured at approximately the same point as injection, utilizing a K-type thermocouple. The following runs were made:

(1) an aqueous solution comprising 6% by weight of ammonia and 15% by weight of hexamethylenetetramine (HMTA), supplied at a rate to give a molar ratio of the nitrogen in the solution to the baseline $NO_x$ of about 5.2:1; for this run, the temperature measured is 1575° F. at the point of injection;

(2) an aqueous solution comprising 6% by weight of ammonia and 15% by weight of ethylene glycol, supplied at a rate to give a molar ratio of the nitrogen in the solution to the baseline $NO_x$ of about 1.3:1; for this run, the temperature measured is 1575° F. at the point of injection;

(3) an aqueous solution comprising 6% by weight of ammonia and 15% by weight of sucrose in water, supplied at a rate to give a molar ratio of the nitrogen in the solution to the baseline $NO_x$ of about 1.3:1; for this run, the temperature measured is 1575° F. at the point of injection;

(4) for the purposes of comparison, a run is made with a solution comprising 10% by weight of urea and 15% by weight of ethylene glycol in water, supplied at a rate to give a molar ratio of the nitrogen in urea to the baseline $NO_x$ of about 1.3:1; for this run, the temperature measured is 1565° F. at the point of injection.

A baseline nitrogen oxides concentration reading is taken prior to beginning each run, and a nitrogen oxides concentration reading is taken after injection to calculate the reduction in the nitrogen oxides concentration in the effluent elicited by each of the solutions injected. Additionally, the concentration of ammonia in the aftertreatment effluent is measured. The results for each run are recorded in Table 1.

TABLE 1

| Run | NO Before (ppm) | NO After (ppm) | % Red. | $NH_3$ (ppm) |
|---|---|---|---|---|
| (1) | 172 | 108 | 37.2 | 12 |
| (2) | 172 | 132 | 23.3 | 0 |
| (3) | 172 | 125 | 27.3 | 2 |
| (4) | 175 | 93 | 46.9 | 26 |

It is clear from the table that by the practice of this invention, substantial reductions in the concentration of nitrogen oxides in the effluent of the combustion of a carbonaceous fuel can be elicited while avoiding the production of undesirable and counterproductive byproducts such as ammonia, which can have detrimental effects.

EXAMPLE II

Using the same apparatus employed in Example I with the same fuel input, excess oxygen level, and chemical feed rate, tests were performed to compare the reduction of nitrogen oxides using ammonia with and without enhancers. The following runs were made:

(1) An aqueous solution comprising 6% by weight of ammonia, supplied at a rate to give a molar ratio of nitrogen in the solution to the baseline $NO_x$ of about 1.46:1; for this run, the temperature is 1510° F. at the point of injection;

(2) An aqueous solution comprising 6% by weight of ammonia and 15% by weight of ethylene glycol, supplied at a rate to give a molar ratio of nitrogen in the solution to the baseline $NO_x$ of about 1.24:1; for this run the temperature is 1525° F. at the point of injection;

(3) An aqueous solution comprising 6% by weight of ammonia and 15% by weight of sucrose, supplied at a rate to give a molar ratio of the nitrogen in the solution to the baseline $NO_x$ of about 1.24:1; for this run the temperature is 1525° F. at the point of injection.

A baseline nitrogen oxides concentration reading is taken prior to beginning each run, and a nitrogen oxides concentration reading is taken after injection to calculate the reduction in the nitrogen oxides concentration in the effluent elicited by each of the solutions injected. The results for each run are recorded in Table 2.

TABLE 2

| Run | $NO_x$ Before (ppm) | $NO_x$ After (ppm) | % Red. |
|---|---|---|---|
| (1) | 181 | 160 | 11.6 |
| (2) | 181 | 128 | 29.3 |
| (3) | 181 | 127 | 29.8 |

It is clear from the table that by the practice of this invention, substantially improved reductions in the concentration of nitrogen oxides in the effluent of the combustion of a carbonaceous fuel can be elicited, beyond those reductions achievable by employing an aqueous ammonia solution alone.

The above descriptions are for the purpose of teaching the person of ordinary skill in the art how to practice the present invention, and they are not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for reducing the concentration of nitrogen oxides in an effluent from the combustion of a carbonaceous fuel, which process comprises injecting into the effluent ammonia and an enhancer selected from the group consisting of hexamethylenetetramine, a lower carbon alcohol, a hydroxyl amino hydrocarbon, sugar, furfural, furfural derivatives, an amino acid, a protein-containing composition, mixtures of ortho-, meta-, and para-methyl phenols, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof, at an effluent temperature above about 1300° F. and a molar ratio of nitrogen in the ammonia and enhancer to the baseline nitrogen oxides level of about 1:5 to about 6:1 wherein the excess of oxygen in the effluent is no greater than about 6%.

2. The process of claim 1 wherein said enhancer is present in said mixture in a weight ratio of enhancer to ammonia of about 1:5 to about 4:1.

3. The process of claim 2 wherein said enhancer comprises hexamethylenetetramine.

4. The process of claim 2 wherein said enhancer comprises a lower carbon alcohol.

5. The process of claim 4 wherein said lower carbon alcohol comprises ethylene glycol.

6. The process of claim 2 wherein said enhancer comprises sugar.

7. The process of claim 1 wherein said mixture comprises an aqueous solution.

8. The process of claim 1 wherein the excess of oxygen in the effluent is about 1% to about 6%.

9. The process of claim 1 wherein said mixture is injected into the effluent at a temperature of about 1300° F. to about 1700° F.

10. A process for reducing the concentration of nitrogen oxides in an oxygen-rich effluent containing less than about 6% excess of oxygen, which process comprises injecting into the effluent droplets of an aqueous mixture of ammonia and an enhancer selected from the group consisting of hexamethylenetetramine, sugar, furfural, a lower carbon alcohol, and mixtures thereof, wherein the temperature of the effluent is about 1300° F. to about 1700° F. and the molar ratio of nitrogen in said mixture to the baseline nitrogen oxides level is about 1:5 to about 6:1.

11. The process of claim 10 wherein said enhancer is present in said mixture in a weight ratio of enhancer to ammonia of about 1:5 to about 4:1.

12. The process of claim 11 wherein said enhancer comprises hexamethylenetetraamine.

13. The process of claim 11 wherein said enhancer comprises sugar.

14. The process of claim 13 wherein said sugar comprises sucrose.

15. The process of claim 11 wherein said enhancer comprises a lower carbon alcohol.

16. The process of claim 15 wherein said lower carbon alcohol comprises ethylene glycol.

17. The process of claim 10 wherein said mixture comprises an aqueous solution.

18. The process of claim 10 wherein the excess of oxygen in the effluent is about 1% to about 6%.

19. The process of claim 11 wherein said enhancer comprises furfural.

* * * * *